United States Patent

Cosper et al.

[11] Patent Number: 5,405,495
[45] Date of Patent: Apr. 11, 1995

[54] RECYCLING OF XEROGRAPHIC WASTE PAPER USING ORGANIC PARTICULATES

[75] Inventors: David R. Cosper, Downers Grove; Karen R. Tubergen, Mt. Prospect, both of Ill.

[73] Assignee: Nalco Chemical Company, Naperville, Ill.

[21] Appl. No.: 87,172

[22] Filed: Jul. 2, 1993

[51] Int. Cl.⁶ .............................................. D21C 5/02
[52] U.S. Cl. .......................................... 162/5; 162/4; 162/6
[58] Field of Search .................... 162/5, 4, 6; 252/8.6, 252/60, 61, 118, 119, 158, 159, 160, 174.23, 174.25

[56] References Cited

U.S. PATENT DOCUMENTS

| | | | |
|---|---|---|---|
| 4,276,118 | 6/1981 | Quick | 162/5 |
| 4,561,933 | 12/1985 | Wood et al. | 162/5 |
| 4,806,261 | 2/1989 | Ciallella et al. | 252/174.25 |
| 4,820,379 | 4/1989 | Darlington | 162/5 |
| 4,919,754 | 4/1990 | Mollett et al. | 162/5 |
| 5,141,598 | 8/1992 | Richman et al. | 162/5 |
| 5,200,034 | 4/1993 | Richmann et al. | 162/5 |
| 5,234,110 | 8/1993 | Kobler | 252/61 |
| 5,259,969 | 11/1993 | Srivatsu et al. | 162/5 |

FOREIGN PATENT DOCUMENTS

| | | | |
|---|---|---|---|
| 0019007 | 1/1985 | Japan | 252/60 |
| 3059319 | 3/1988 | Japan | 252/60 |

OTHER PUBLICATIONS

Seldin, Ira, "Xerographic Copy Recycling", Pulping Conference 1985, TAPPI Proceedings, pp. 303–310.
Quick, T. H. and Hodgson, K. T., "Xerography Deinking-A Fundamental Approach", 1985 Pulping Conference, TAPPI Proceedings, pp. 561–566.
Lapoint et al., "The Deinking of Xerographic Paper by Flotation", 1988 Pulping Conference, TAPPI Proceedings, pp. 81–94.

Primary Examiner—W. Gary Jones
Assistant Examiner—Mark De Simone
Attorney, Agent, or Firm—Robert A. Miller; James J. Drake

[57] ABSTRACT

A method for deinking of repulped xerographic paper comprising adding an organic polymeric particulate and a substantially water insoluble organic ester to a repulped aqueous slurry containing xerographic toner particles in an amount sufficient to at least partially agglomerate the xerographic toner particles within the slurry to larger particle sizes; and removing the xerographic toner particles from the slurry by one or more liquid/solid separation techniques.

10 Claims, 2 Drawing Sheets

RECYCLING OF XEROGRAPHIC WASTE PAPER USING ORGANIC PARTICULATES

The present invention relates generally to a method of recycling xerographic waste paper. More particularly, it relates to the deinking of xerographic waste paper using an organic ester and a solid polymeric powder to agglomerate the xerographic toner such that the toner may be separated from the paper fibers of a repulped aqueous slurry.

BACKGROUND OF THE INVENTION

Mixed office waste is receiving considerable interest as a source of recycled fiber, particularly in printing and writing grades. Currently, it is one of the major grades of waste paper available accounting for almost 3,000,000 tons/year. The major problem in using mixed office waste, and the reason why it is currently underutilized, is that it contains a high percentage of difficult to deink, non-impact printed material.

Xerography is a method for producing documents by an electrostatic technique. Xerography is used by both xerographic copying machines (photostatic duplicating machines) and by "laser" printers to produce copies or computer drafted originals, respectively. Such xerographic machines are now widely used as office equipment, and generate a great amount of waste paper. This waste paper is a large source of high-quality recycled fiber.

In xerography, an electrostatic image is produced on an electrostatically charged plate (photoconductive insulating surface) by a radiation differential, i.e., different amounts of radiation falling on different parts of the plate. A dark powder, generally referred to as a toner, of opposite charge to that of the plate, is applied and adheres to the charged areas, from which it is transferred to paper or a similar medium. Xerography is thus a reproduction method that employs a dry or low moisture (xeric) "ink".

When one document is being produced from another fixed-medium document, such as in xerographic copying, ultraviolet light is passed through the document to be copied. Where the ultraviolet light is not blocked, it discharges the plate; where the ultraviolet light is blocked by inked sections or the like, the plate is not discharged. A similar xerographic technique is employed by laser printers.

The toner is generally comprised of carbon black and certain thermoplastic polymers (i.e., binders), with other ingredients. The toner is applied to a paper sheet by the non-impact (i.e., without localized impact) electrostatic method, and fused by heat to promote adhesion of the thermoplastic binder to the sheet.

Polymeric thermoplastic binders found in xerographic toners generally comprise from about 80 to about 90 weight percent thereof. Such thermoplastic binders routinely have softening temperatures in the range from about 60° C. to about 100° C. which is the common temperature range for adhesion fusion of such toners to the paper substrate. Some toners employ thermoplastic binders of substantially a single type of polymer, such as a random styrene-predominant copolymer of high-carbon alkyl acrylate ester, for instance 2-ethylhexyl acrylate. Other binders include a styrenevinylcarboxylic acid ester, a styrene-butadiene copolymer, and a bis-phenol A resin and ester. Still other toners have thermoplastic binders that are polymer blends, for instance blends of poly(methyl methacrylate) and nylon.

Waste paper (i.e., commonly referred to in the art and herein as "xerographic paper" or "xerographic waste paper") produced by xerography is a significant potential source of recycled fiber. The paper of xerographic paper is routinely manufactured from a bleached chemical pulp which is a higher grade of pulp than for instance that used for newspaper. Paper recycling normally requires the fiber to be repulped and deinked. Conventional deinking processes, however, were developed for the high volume recycling of newspaper. Xerographic toners are different from the newsprint inks for which deinking processes were designed. The conventional deinking processes used for recycling newspapers do not achieve the performance level on xerographic paper required for a high grade of recycled paper.

Conventional deinking (such as that used for newsprint deinking) is comprised of three distinct steps. First the ink is removed, or separated, from the paper fiber. This usually occurs while the waste paper is being repulped in water and is routinely aided by caustic and surfactant. Secondly, the separated ink is dispersed to a small particle size. The dispersion step usually occurs concomitantly with the separation step. In the third step, the dispersed ink is usually separated from the repulped fiber slurry by washing or flotation.

Efficient deinking demands both a successful separation of ink from the fiber and a successful separation of the ink dispersion from the fiber slurry. A deinking process that successfully separates the ink from the fiber and successfully disperses the ink into the aqueous phase of the slurry as small particles will be inadequate if thereafter it does not provide effective removal of the ink from the fiber slurry. Dispersed ink particles that are carried along with the fiber in the slurry will in some degree be retained on the fiber during paper formation, resulting in a general gray hue or distinct spots, and commonly a low brightness.

The performance of a deinking process is usually judged by a dirt or speck count and by total reflectance, i.e., brightness, of the paper product produced from the recycled, deinked pulp. In a speck or dirt count method, a test sheet is formed of the repulped and deinked slurry, and then the number of ink particles that can be seen on the sheet by the naked eye per unit weight or unit area are counted. The ink or toner particles that can be detected, and thus counted, by this method are only those having a diameter greater than about 50 micrometers. However, most particles that survive a deinking process are smaller than 50 micrometers and although they cannot be seen by the naked eye, they lower the brightness more than the larger particles. The presence of such deleterious smaller particles are thus detectable from the reflectance, or brightness, level of the test sheet.

Simple alkaline repulping methods have been found to separate xerographic toners from fiber. Such repulping disperses the toner to a wide distribution of particle sizes, including small, intermediate and large (above >50 micrometers) particle sizes. The separation of the intermediate and large ink particles cannot be achieved by simple washing. Washing requires small ink particles (about <10 micrometers) that can pass through the fiber mat and washer wire. Most North American recycle mills were designed to handle pulps such as repulped newsprint that respond to simple washing, and these washing systems do not sufficiently separate the intermediate and large xerographic toner particles from the slurry. The other conventional separation methods require particles that are larger than the small and intermediate size xerographic paper toner particles.

Flotation for instance requires large particles that can be induced to adhere to air bubbles. Newer recycle mills have both washing and flotation capability, and the combination of such methods may produce a relatively clean pulp, but with a reduced pulp yield believed to be caused by low selectivity in the flotation step.

Screening requires that the particles be larger in all dimensions than the screen openings and have a high enough modulus of elasticity or plasticity to avoid being extruded into the screen openings. Even the intermediate size xerographic ink particles may be small enough in their smallest dimension to pass through such openings.

Centrifugal cleaners require an appropriate particle size, particle shape and a density differential for removal. The intended reject particles (i.e., ink particles) must differ in density from the intended "accepts" (i.e., the fiber slurry). It is believed that the irregular flat shape of xerographic ink particles as repulped creates at least some of the difficulties encountered in separation by centrifugal cleaners.

Co-pending U.S. patent application Ser. No. 07/942,816 (Cosper), filed on Sep. 10, 1992, discloses a unique method whereby certain low molecular weight, water-insoluble organic esters act to agglomerate toner particles during the repulping process. By agglomerating toner fragments they can be separated from the fiber slurry by centrifugal cleaners and screens. This particular method for deinking of xerographic paper comprises repulping the xerographic paper to separate the xerographic toner from the fiber, adding a substantially water insoluble organic ester to the repulped slurry, whereby the xerographic toner particles within the slurry are at least partially agglomerated to larger particle sizes, and then removing the xerographic toner particles by one or more liquid/solid separation techniques. The ester typically has the structure of Formula I below:

$$C_mH_n(COOR)_x \qquad (I)$$

wherein x is an integer of at least 1, R is an alkyl having from 1 to about 12 carbon atoms, m is an integer having a value of from about 1 to about 20, or 22, and n is an integer having a value of from about m−2 to about 2m+1, and when x is more than 1, each R is separately an alkyl having from 1 to about 12 carbon atoms; provided that the ester has at least about eight total carbons. The ester is preferably diisobutyl succinate, diisobutyl glutarate, diisobutyl adipate, trans-methyl cinnamate or combinations thereof.

The present inventors have discovered that some toners do not respond well to ester treatment. That is, little or no aggregation occurs even at high doses of the agglomerating agent. In other instances, toners can be readily overdosed to afford large, tacky particles which are unsuitable for mechanical separation.

The present inventors have undertaken the task of exploring chemistries capable of enhancing the performance of the organic ester agglomerating agent in the repulping of xerographic waste paper. Through extensive experimentation, the present inventors have developed a universal treatment system capable of causing toner agglomeration in most xerographic waste paper.

The novel treatment system according to the present invention involves the addition of an organic ester together with a water insoluble, polymeric particulate material to enhance the agglomeration of xerographic toners during waste paper repulping.

The combined use of liquids and solid particulates to agglomerate toners has been disclosed in U.S. Pat. Nos. 4,276,118 (Quick), which issued on Jun. 30, 1981, and 4,820,379 (Darlington), which issued on Apr. 11, 1989. The Quick patent discloses a process which uses solid polymers such as polystyrene or poly(vinyl chloride) (PVC) in combination with a water-insoluble liquid which must be an aliphatic alcohol or a saturated aliphatic hydrocarbon. In accordance with Quick the temperature of the pulp slurry should be at or above the softening point of the toner.

The present inventors have found that aliphatic alcohols alone do not agglomerate toners, at least at ambient temperature. The process of the Quick patent has also experienced problems in the separation of agglomerates from pulp.

To the contrary, the present invention is capable of agglomerating toners at very low temperatures, e.g., 25° C., while the Quick patent requires elevated temperatures. This is because the liquid esters of the present invention tackify toner without heat; whereas the aliphatic alcohol or hydrocarbon according to the Quick patent does not. Moreover, the agglomerating agents of the present invention are capable of deinking mixed office waste that contains xerographic as well as impact printed paper; whereas the treatment process according to the Quick patent had difficulty removing toner when repulping mixed office waste.

The Darlington patent discloses a two component treatment system comprising an aqueous medium containing polymeric material (e.g., polystyrene or a styrenecarboxylic acid copolymer) and a compound or mixture of compounds of the Formula $R(OCH_2CH_2)nR^1$ wherein R is a $C_6$ to $C_{20}$ linear or branched alkyl, and $R^1$ is a halogen or the like. These agglomerating agents require high process temperatures, i.e., 60°–75° C. and very specific agglomerating chemicals. Halogen-terminated polyethers are not common materials of commerce resulting in periodic cost and supply problems.

The present invention also provides many additional advantages which shall become apparent as described below.

SUMMARY OF THE INVENTION

The present invention provides a method for deinking of repulped xerographic paper comprising repulping the xerographic paper to separate the xerographic toner from the paper fiber, adding an organic polymeric particulate and a substantially water insoluble organic ester to a repulped aqueous slurry containing xerographic toner particles in an amount sufficient to at least partially agglomerate the xerographic toner particles within the slurry to larger particle sizes, and removing the xerographic toner particles from the slurry by one or more liquid/solid separation techniques. The present invention also provides a method for recycling of xerographic paper which includes the further step of forming a paper sheet from the deinked and repulped aqueous slurry.

Furthermore, the present invention provides a novel agglomerating agent for use in deinking of repulped xerographic paper which comprises an organic polymeric particulate and a substantially water insoluble organic ester.

Other and further objects, advantages and features of the present invention will be understood by reference to the following specification in conjunction with the annexed drawings, wherein like parts have been given like numbers.

DESCRIPTION OF THE PREFERRED EMBODIMENTS

Figure 1:
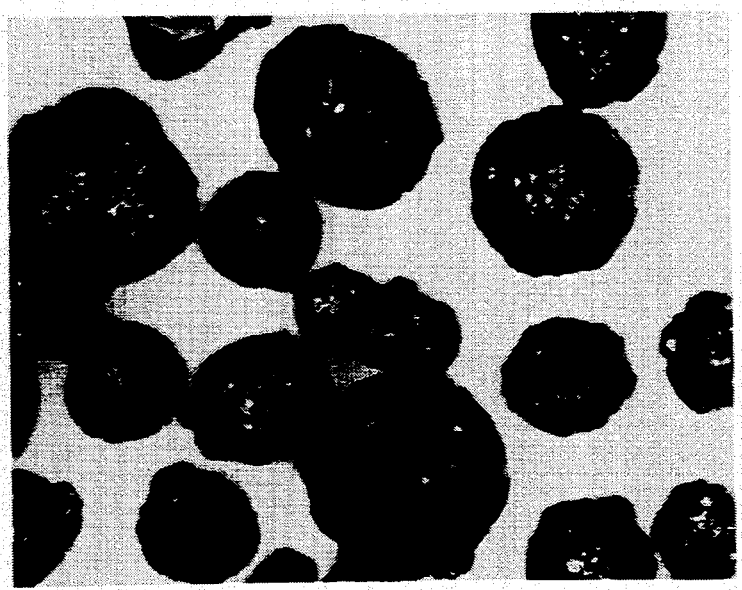
FIG. 1 is a photomicrograph of Ricoh FT7770 toner agglomerates formed in the presence of Exxate 600 and 1.1% poly(vinyl chloride-co-vinyl acetate) at a magnification of 20×.

The present invention pertains to a novel agglomerating agent for use in deinking of repulped xerographic paper which comprises an organic polymeric particulate and a substantially water insoluble organic ester.

The preferred method for deinking of repulped xerographic paper comprising adding an organic polymeric particulate and a substantially water insoluble organic ester to a repulped aqueous slurry containing xerographic toner particles in an amount sufficient to at least partially agglomerate the xerographic toner particles within the slurry to larger particle sizes, and removing the xerographic toner particles from the slurry by one or more liquid/solid separation techniques.

The agglomeration is preferably conducted at a temperature in the range between about 15° C. to about 45° C., more preferably about 18° C. to about 35° C.

The solids/liquid separation method is selected from the group consisting of: screen, dissolved air flotation and centrifugal cleaning.

The organic polymeric particulate is preferably added to the repulped aqueous slurry in an amount between about 0.5 to about 2.0 weight percent, based on the total weight of dry solids in the repulped aqueous slurry. The ester is preferably added to the repulped aqueous slurry in an amount between about 0.5 to about 2.0 weight percent, based on the total weight of dry solids in the repulped aqueous slurry. Enhanced activity and agglomerate density result when the particulate is added to the repulped aqueous slurry before addition of the ester.

This unique agglomerating agent of the present invention is particularly useful in the recycling of xerographic paper. When used to recycle xerographic paper the following steps are desirable: repulping an aqueous paper slurry of xerographic paper which comprises xerographic toner particles and paper fiber; adding an organic polymeric particulate and a substantially water insoluble organic ester to the repulped aqueous slurry in an amount sufficient to at least partially agglomerate the xerographic toner particles within the slurry to larger particle sizes; removing the xerographic toner particles from the repulped aqueous slurry by one or more liquid/solid separation techniques to form a fiber-rich portion and a toner-rich portion; and forming a paper sheet from the fiber-rich portion.

The present invention provides agglomeration of the toner particles to larger particle sizes that permit the separation of such agglomerated toner particles by liquid/solid separation techniques which would be insufficient if employed on untreated slurries. Thus, the present invention provides a method whereby both small and large particles are removed from the repulped slurry, and hence the paper produced from such a slurry is vastly improved as to both speck count and brightness. Since a low speck count and a high brightness are required of high quality paper, the present invention provides for high quality recycling of xerographic paper.

The method of the present invention has been found effective for agglomerating repulped xerographic toners at ambient room temperature or somewhat higher temperatures (i.e., from about 15° C. to about 45° C.). The employment of room temperature treatment, or somewhat higher temperatures if pulping is conducted at such temperatures, is highly advantageous, eliminating the need for raising the temperature for the treatment period and the concomitant consumption of energy and the time required for heating and subsequent cooling. The cost reductions include not only energy and servicing costs, but also equipment and processing time costs and the like. Therefore, the treatment of the present invention is preferably conducted at a temperature of from about 15° C. to about 45° C., more preferably from about 15° C. to about 40° C., and most preferably from about 18° C. to about 35° C. The present invention does not exclude the use of higher temperatures during either the repulping or the deinking treatment, such as temperatures up to about 50° C. or 60° C., or possibly even higher, but generally there is no practical reason for the use of such higher temperatures. It has been found that esters which are a solid state at ambient room temperatures may be added in melted form to a room temperature slurry with results similar to that obtained when the melted ester is added to a heated slurry. The esters of the present invention are generally liquids at room temperature or are low melting point solids.

The solids/liquid separation technique most advantageously selected is dependent upon the size, shape, density and hardness/tackiness of the agglomerated toner particles produced, or other physical and/or chemical characteristics thereof. A primary factor controlling such characteristics is the dosage of the agglomerating agent used in the treatment, and hence the present invention permits control of such factors. One therefore may possibly tailor the dosage, or the dosage and agglomerating agent selection, to meet the requirements of a given solids/liquid separation method. In the preferred embodiment the solids/liquid separation method is screening or dissolved air flotation or centrifugal cleaning, all of which techniques are well known to those of ordinary skill in the art. The present invention does not, however, exclude the use of a combination of such techniques. The present invention also does not exclude the use of other solids/liquid separation techniques, such as washing.

Treatment of the slurry by the method of the present invention provides agglomeration of particles that vary from diminishing the number of the very small toner particles of about 5 to 10 micrometers in size, which otherwise would be prevalent particle size, to the congealing of the entire population of toner particles into a few very large agglomerates. There has been no indication of agglomerated particle/fiber attachment, except in instances where very large and very tacky agglomerates were formed, and even then the proportion of fiber that would follow the agglomerates upon removal was negligible.

Many of the esters within the present invention form very large and soft agglomerates at higher dosage levels, and these agglomerates generally are formed very rapidly. Therefore, one may select the treatment parameters based on what factors are more important to a given commercial repulping facility. One may employ a higher dosage of ester, and thus reduce treatment time, or instead use a lower ester dosage to obtain smaller but harder agglomerates for separation by screening and like techniques for which the harder agglomerates may be more advantageous.

Certain esters have been found to form agglomerates that are both very large and hard. Such esters include diisobutyl DBE (i.e., a commercial mixture of diisobutyl succinate, glutarate and adipate) and trans-methyl cinnamate, and the use of those esters are preferred embodiments of the invention.

The organic ester employed in the present invention may be added neat to the repulped slurry. If the ester is a solid at room temperature it generally should be melted, if added neat. The invention does not, however, exclude the use of solvent as a vehicle for the ester, although there may be no practical reason for employing such a solvent. Even if the ester is solid at room temperature, the addition of such an ester in melted form to a room temperature slurry appears effective even for a normally solid ester. If it is desired for any reason to add the ester in a solvent, the solvent should be chosen from those that do not have any deleterious effect on the present invention.

A single ester may be employed or a plurality of esters may be used in combination. It is believed that the control of the agglomerate characteristics that has been demonstrated by selection of ester dosage, and by selection of ester, may be even more fine tuned by the use of combinations of esters, selecting the type of ester, ratios of the esters in the combination, and the dosages of the combination. The preferred ester is selected from the group consisting of: diisobutyl succinate, diisobutyl glutarate, diisobutyl adipate, trans-methyl cinnamate and combinations thereof.

The organic polymeric particulate is selected from the group consisting: polyvinylchlorides, polyvinylbutyrals, polyethylmethacrylates, polybutylmethacrylates, polyethylenes, chlorinated polyethylenes, copolymers of polyvinylchloride and acrylic acid, copolymers of polyvinylchloride and methyl acrylate, and copolymers of polyvinylacetate and polyvinylchloride. However, any other particulate known to those of ordinary skill in the art is also contemplated hereby.

In general, the treatment of the present invention provides agglomerates of toner particles that tend to be spherical, which is an advantageous particle shape for solids/liquid separation techniques such as centrifugal cleaning, and are much larger than their precursor toner particles, which is advantageous for most all solids/liquid separation techniques.

The present invention is useful for the recycling of paper whenever there is sufficient xerographic toner in the furnish to speck the paper product and/or diminish the brightness of the paper product to an extent that is unacceptable for high quality paper. Such deleterious effects are dependent to some extent on the amount, and possibly composition, of thermoplastic binder in the toner, on the amount, and possibly composition, of toner on the xerographic paper included in the furnish, and on the percent of xerographic paper in the paper source used for the furnish. As a general guideline, the amount of binder in the toner is from about 80 to about 90 weight percent, but deleterious effects are believed likely if a toner has even as low as 20, or 10 percent, or possibly even less, thermoplastic binder, if other factors are at least within normal ranges. The amount of toner on the xerographic paper is as an average generally from about 0.1 to about 2.0 or 2.5, weight percent based on total paper weight, but deleterious effects are believed likely if the xerographic paper has toner in amounts even as low as 0.01, or 0.001, weight percent, or possibly even less, if other factors are at least within normal ranges. The amount of xerographic paper in the waste paper source is from about 10 to about 80 weight percent, but deleterious effects are believed likely if a paper source has even as low as 5, or 1, percent, or possibly even less, xerographic paper, if other factors are at least within normal ranges.

Moreover, although as mentioned above the typical xerographic toner contains a thermoplastic binder that has a softening point within the 60° C. to 100° C. range, it is believed that a thermoplastic binder that has a softening point within the broader 40°, or 45° C., to 100°, or 120° C., range would exhibit the same or similar resistance to conventional deinking methods, and have the same or similar response to the treatment of the present invention.

The paper slurry generally should be under at least some degree of mechanical agitation at the time of treatment by the addition of the ester thereto and a time period thereafter, and the degree of agitation is believed to be one factor determining the optimal time period for continued mechanical agitation after the addition of the ester. As a general guideline, for a repulped slurry having a consistency of from about 0.5 to about 16 weight percent, mechanical agitation equivalent to rotary stirring at from about 10 to about 1000 rpm for a time period of from about 5 to about 180 minutes should be sufficient for the formation of agglomerates of toner particles. For a repulped slurry having a consistency of from about 2.5 to about 5 weight percent, mechanical agitation equivalent to rotary stirring at from about 10 to about 1000 rpm for a time period of from about 20 to about 120 minutes should be sufficient for the formation of agglomerates of toner particles.

The repulping of the furnish generally should be conducted, as general guidelines, for a repulped slurry having a consistency of from about 0.5 to about 16 weight percent, mechanical agitation equivalent to rotary stirring at from about 800 to about 2500 rpm for a time period of from about 5 to about 120 minutes at a pH of from about 7 to about 12, should be sufficient for the separation of toner particles from the fibers of the waste paper, and of course the repulping of the waste paper.

In the preferred embodiment the organic ester employed in the method of the present invention is an organic ester having a solubility in water that does not exceed its use concentration in the aqueous phase of the cellulosic slurry, and in a more preferred embodiment, for commonly encountered repulping and treatment conditions, a water solubility that does not exceed about 0.1, or 0.075, weight percent.

Preferably the organic ester has the general Formula I below:

$$C_mH_n(COOR)_x \quad (I)$$

wherein x is an integer of at least 1, R is an alkyl having from 1 to about 12 carbon atoms, m is an integer having a value of from about 1 to about 20, or 22, and n is an integer having a value of from about m−2 to about 2m+1, and when x is more than 1, each R is separately an alkyl having from 1 to about 12 carbon atoms; provided that the ester has at least about eight total carbons.

When the organic ester is a mono- or diester, that is when x is either 1 or 2, the organic ester has the general Formula II below:

$$R'-(-C_mH_n-)-R'' \quad (II)$$

wherein R' is hydrogen or —COOR1, R" is hydrogen or —COOR2, R1 and R2 are independently alkyls having from 1 to about 12 carbon atoms, m is an integer having a value of from about 1 to about 20, or 22, and n is an integer having a value of from about m−2 to about 2m+1; provided that R' and R" are not both hydrogen, and provided that the ester has at least about eight total carbons.

In a more preferred embodiment, x of formula I is an integer of from 1 to about 7 or 8, and commonly does not exceed about 4 or 5.

Each R(including R1 and R2) may independently be linear or branched, saturated or unsaturated, alkyl radicals, such as methyl, ethyl, n-propyl, isopropyl, n-butyl, isobutyl, t-butyl, n-pentyl and the various isomers thereof, n-hexyl and the various isomers thereof, n-heptyl and the various isomers thereof, n-octyl and the various isomers thereof including particularly 2-ethylhexyl, n-nonyl and the various isomers thereof, and the like up to about alkyls of 10 to 12 carbons. $C_mH_n$ may be a linear or branched, saturated or unsaturated, alkylene radical, including aromatic radicals such as —C6H4— and partially aromatic radicals such as —C6H4—C≡CH—.

Test Method

A typical test procedure used to demonstrate the agglomerant activity of the additives of the present invention is as follows. A supply of standard test sheets, representative of xerographic waste paper, was generated by copying the TAPPI UM 204 method, published in "1991 TAPPI Useful Methods" incorporated herein by reference. The standard test sheets are made by copying a standard single-sided test-containing sheet (8.5"×11") on a Canon NP6650II xerographic copying machine. The standard test sheet weighs about 4.5 grams and contains from about 0.5 to about 1.0 weight percent toner. For repulping, these sheets are first cut into 1"×1" squares (i.e., 88 squares per sheet). The repulping of the sheets is accomplished by stirring the admixture at 1500 rpm for five minutes, and then at 1000 rpm for about 55 minutes in the 600 ml beaker, using a three-bladed metal prop (2.5 cm radius, 45° pitch, powered by a constant rpm motor) placed about 0.5 cm from the bottom of the beaker. The resultant slurry has a consistency of about 3.6% and a pH of about 11. The additive being tested is added dropwise for about 20 seconds to the slurry during repulping after the first four minutes of stirring at 1500.

Handsheets are then made from the repulped slurry. The slurry is diluted to 1000 ml with deionized water, in a glass cylinder. 200 ml of the diluted pulp slurry are used per handsheet, which is made in a British sheet mold. The sheets are blotted and then transferred by hand from the blotters to the metal plates without pressing to preserve the shape of the toner agglomerates. The sheets are air dried overnight at 50% relative humidity and 23° C. The toner particles are not separated from the pulp slurry, and without additive, or with a nonactive additive, the particles are retained on the handsheet as unagglomerated irregularly-shaped particles.

Performance or agglomerant activity was judged, under magnifications of 10× and 50×, by the presence and size of the agglomerates and whether any of the toner particles were still in the small particle state, using the following numerical rating system: 0=no activity (i.e., small toner particles as seen in an untreated control); 1=qualified activity (i.e., agglomerates present on the order of 1 mm diameter, together with substantial amounts of small particles); 2=intermediate activity (i.e., significant number of spherical agglomerates on the order of 1 mm diameter, together with significant numbers of small particles); 3=high activity (i.e., agglomerates on the order of 1 mm to <2 mm diameter and small particles eliminated); and 4=superior activity (i.e., large agglomerates on the order of >2 mm diameter and small particles eliminated). These numerical ratings are referred to as "Activity Ratings" below. In some instances particle size was determined by image analysis using an Omnicon 3600 Image Analysis System.

The density of toner agglomerates was determined by the following method:

1. Twenty particles are placed into each of two 25×175 mm glass cylindrical tubes.
2. Ten grams of deionized water is added to each tube. The mixture is gently swirled to defer any surface tension problems encountered with the liquid-particle interface.
3. The tubes and contents are equilibrated at 30° C. for 10 minutes in a constant temperature water bath.
4. The number of floating particles per tube is recorded.
5. A predetermined mass (equivalent to a density change of 0.05 g/cc) of a 40% sodium bromide solution is added to each tube. The contents are thoroughly mixed with agitation. Steps 3, 4, and 5 are repeated as necessary.

The following materials were used in the below experiments: diisobutyl DBE (composed of 10–20% diisobutyl adipate, 55–70% diisobutyl glutarate, and 20–30% diisobutyl succinate) manufactured by DuPont Chemical; Exxate 600 (an ester of $C_5$-$C_7$ branched oxo-alcohols) manufactured by Exxon Chemical Co.; poly(vinyl chloride) consisting of 10–20 μm particles and aggregates of 100–150 μm size acquired from the Aldrich Chemical Company; and poly(10% vinyl acetate/vinyl chloride) copolymer consisting of 5–10 μm particles and a wide distribution of aggregates up to 200 μm acquired from the Aldrich Chemical Company; Geon ® 121, a homopolymer resin having an average particle size of 1 μm and inherent viscosity (IV) of 1.19 manufactured by B. F. Goodrich Co.; Geon ® 213 a homopolymer resin having an average particle size of 30 μm and an IV of 0.848; Geon ® 137 a copolymer with 2.5% acrylic acid having an average particle size of 1.2 μm and an IV of 1.1; and Geon ® 138 a copolymer with 4.0% methyl acrylate having a particle size in the range between 0.2–15μm.

EXAMPLE 1

Sheets printed with difficult-to-agglomerate Ricoh toner were repulped with 1% BOP (based on paper) sodium hydroxide and 1.1% (BOP) poly(vinyl chloride) or poly(10% vinyl acetate/vinyl chloride). After four minutes into the repulping, 2.0% (BOP) Exxate 600 was added and pulping continued for one hour. Control experiments were run without the particulates. However, large (1–2 mm) aggregates with many small unagglomerated fragments were afforded. A photomicrograph of agglomerates formed in the presence of the copolymer is shown in FIG. 1.

Figure 2:
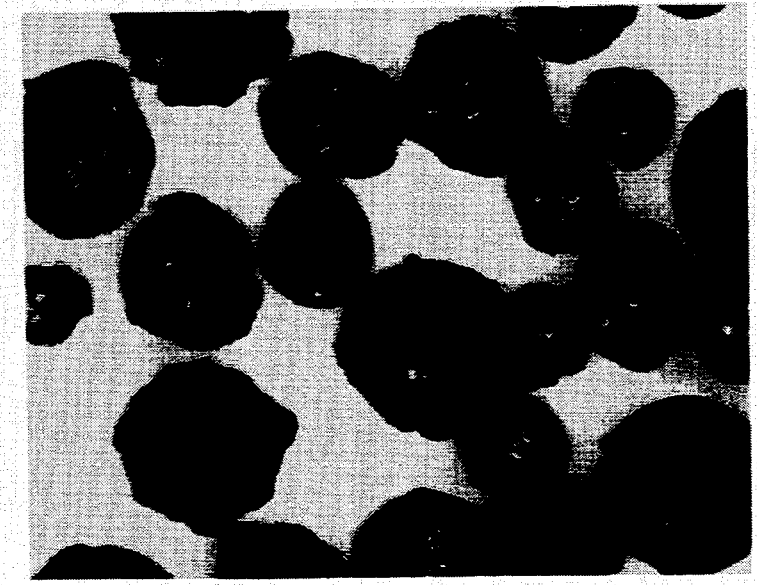
FIG. 2 is a photomicrograph of Ricoh FT7770 toner agglomerates formed in the presence of Exxate 600 and 1.1% −200 mesh poly(vinyl chloride) at a magnification of 20×.
Figure 3:
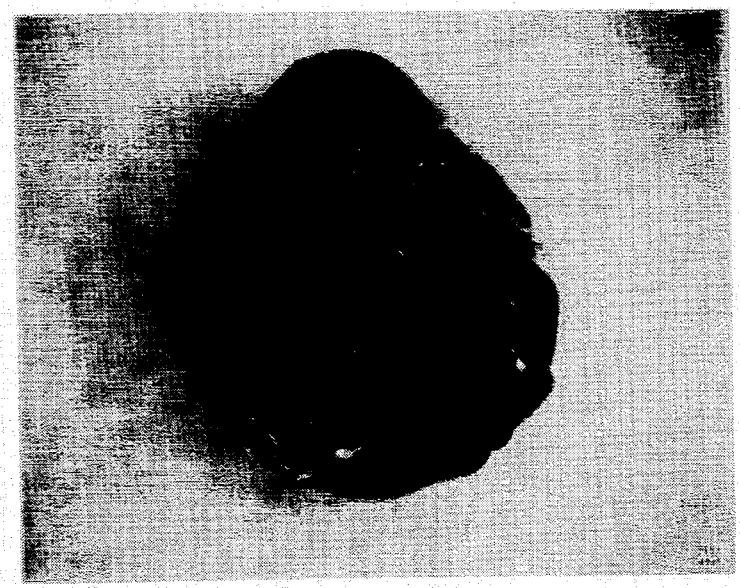
FIG. 3 is a cross-section photomicrograph of Ricoh FT7770 toner agglomerated with 2% Exxate 600 and 1.1% −200 mesh poly(vinyl chloride) at a magnification of 20×.

The PVC sample was separated into −200 and +100 mesh fractions which were used to repeat the above experiment. The handsheets were qualitatively similar to those obtained using the unfractionated PVC. A typical agglomerate (using 200 mesh PVC) is depicted in FIG. 2. These agglomerates are somewhat porous and contain a few fibers (see FIG. 3). Some of the white material seen in the cross-section may be PVC.

EXAMPLE 2

Figure 4:
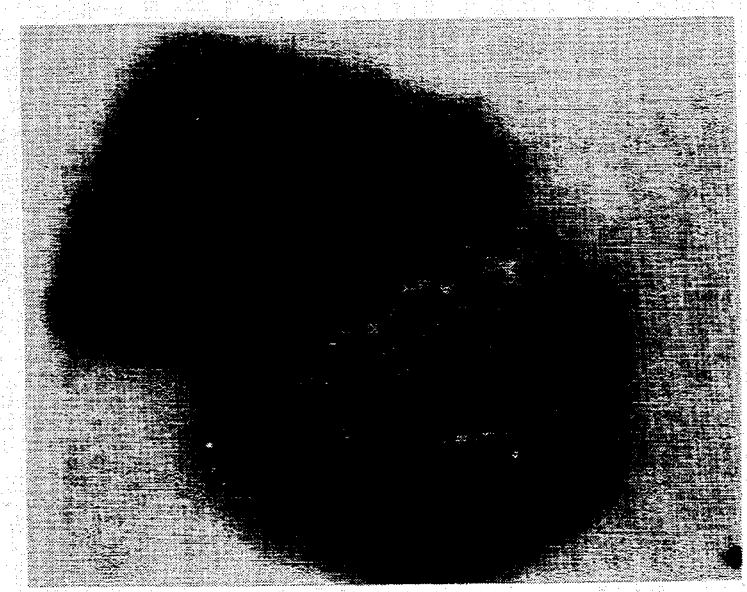
FIG. 4 is a cross-section photomicrograph of Ricoh FT7770 toner agglomerated with 2% Exxate 600 and 1.1% poly(vinyl chloride) (at 10% solution of DMF) at a magnification of 20×.

In an attempt to obtain a more finely dispersed seed, PVC was dissolved in N,N-dimethylformamide (10 wt. %). This solution was added at the start of the repulping cycle. Addition of Exxate 600 resulted in the almost immediate appearance of large gray, oblong-shaped particles (~4 mm in length). The particles, however, have a white core with a patchy, black coating as exhibited in FIG. 4. Apparently this method of PVC addition produces large balls which pick up toner fragments in the presence of agglomerant. Mixing at high shear (1500 rpm) was insufficient to break up the viscous PVC solution into small droplets.

EXAMPLE 3

A mixture of sheets printed with Canon and Ricoh toners were repulped at room temperature with 1.0% sodium hydroxide. The purpose of this experiment was to see if an "easy-to-agglomerate" toner such as Canon NP6650II toner (Toner M) could act as a seed for a "hard-to-agglomerate" toner (Ricoh). These pulps were treated with 20% (wt./vol. in isopropanol) solutions of diisobutyl DBE or Exxate 600. Agglomeration was achieved with 1.0% diisobutyl DBE and with 3.0% Exxate 600. Very small particles (~10 μm) remained in either successful run and the pulp was white rather than gray. The aggregates were somewhat soft, but not tacky. Thus, it appears that in this case, fragments of the Canon toner (Toner M) induced the Ricoh toner to agglomerate.

EXAMPLE 4

Paper printed with a variety of single Xerox, Canon and Kodak toners were repulped at 45° C. with 1.0% sodium hydroxide, 1.0% poly(vinyl chloride) or poly(vinyl chloride-co-vinyl acetate) and 1.0% diisobutyl DBE. Control runs without particulate were obtained for comparison. The various toners are described below in Table 1.

TABLE 1

| Toner # | Thermoplastic | Quat. | % Fe2O3 | % SiO2 |
|---|---|---|---|---|
| A | poly(styrene-co-butyl acrylate + polypropylene wax | N,N,N-tributylbenzenemethanammonium salt with 4-hydroxy-1-naphthalenesulfonic acid | 46 | 1.5 |
| B | poly(styrene-co-butyl methacrylate) | | 0 | 0.8 |
| C | poly(styrene-co-1,3-butadiene) | dimethyldioctadecylammonium methylsulfate | 14.4 | 0 |
| G | poly(styrene-co-1,3-butadiene) + polypropylene wax | dimethyldioctadecylammonium methylsulfate | 0 | 0.8 |
| H | styrene-acrylate copolymer + polystyrene | | 41.0 | 0 |
| I | poly(styrene-co-2-ethylhexyl acrylate) | | 33.7 | 0 |
| J | styrene-acrylate copolymer | | 41.0 | 0 |
| K | styrene-acrylate copolymer + polystyrene | | 43.2 | 0 |
| L | styrene-acrylate copolymer | | 40.5 | 0 |
| M | polyester resin | | 32.8 | 0 |
| O | poly(styrene-co-methyl methacrylate) + poly(styrene-co-butyl acrylate) | N,N,N-trimethyl-3-[(1-oxododecyl)0amino]-1-propanammonium methylsulfate | | trace |

Average particle sizes determined by image analysis are given in Table 2 below which demonstrates the agglomeration of the above-listed xerographic toners with diisobutyl DBE, enhanced with poly(vinyl chloride) and poly(vinyl chloride-co-vinyl acetate).

TABLE 2

| Toner | PVC Dose (%) | PVC-co-Vinyl Acet. Dose (%) | DBE Dose (%) | Area/Particle # Average [Total Count] | Area/Particle # Average [>0.002 mm$^2$] | Area/Particle Area Average [>0.002 mm$^2$] |
|---|---|---|---|---|---|---|
| A | 0 | 0 | 1 | 0.0705 | 0.1370 | 0.4840 |
| A | 1 | 0 | 1 | 0.1810 | 0.2800 | 0.8020 |
| A | 0 | 1 | 1 | 0.1030 | 0.1430 | 0.6810 |
| B | 0 | 0 | 1 | 0.0114 | 0.0209 | 0.3670 |
| B | 1 | 0 | 1 | 0.1770 | 0.2890 | 6.8970 |
| B | 0 | 1 | 1 | 0.2060 | 0.3330 | 3.7850 |
| C | 0 | 0 | 1 | 0.0642 | 0.0970 | 0.4170 |
| C | 1 | 0 | 1 | 0.0879 | 0.1390 | 15.9200 |
| C | 0 | 1 | 1 | 0.1580 | 0.2380 | 4.7670 |
| G | 0 | 0 | 1 | 0.1810 | 0.3260 | 5.3640 |
| G | 1 | 0 | 1 | 0.2560 | 0.4120 | 7.8890 |

TABLE 2-continued

| Toner | PVC Dose (%) | PVC-co-Vinyl Acet. Dose (%) | DBE Dose (%) | Area/Particle # Average [Total Count] | Area/Particle # Average [>0.002 mm²] | Area/Particle Area Average [>0.002 mm²] |
|---|---|---|---|---|---|---|
| G | 0 | 1 | 1 | 0.1520 | 0.2260 | 1.4830 |
| H | 0 | 0 | 1 | 0.0870 | 0.1440 | 0.5480 |
| H | 1 | 0 | 1 | 0.2130 | 0.3640 | 2.7170 |
| H | 0 | 1 | 1 | 0.2060 | 0.2980 | 1.4000 |
| I | 0 | 0 | 1 | 0.0889 | 0.1150 | 0.3760 |
| I | 1 | 0 | 1 | 0.1770 | 0.2770 | 2.0880 |
| I | 0 | 1 | 1 | 0.2170 | 0.3210 | 1.3520 |
| J | 0 | 0 | 1 | 0.1490 | 0.2030 | 0.8620 |
| J | 1 | 0 | 1 | 0.1960 | 0.3260 | 2.3750 |
| J | 0 | 1 | 1 | 0.2100 | 0.3030 | 1.2170 |
| K | 0 | 0 | 1 | 0.0918 | 0.1320 | 1.5470 |
| K | 1 | 0 | 1 | 0.0889 | 0.1290 | 1.5900 |
| K | 0 | 1 | 1 | 0.1680 | 0.2360 | 1.2120 |
| L | 0 | 0 | 1 | 0.0339 | 0.0515 | 0.1620 |
| L | 1 | 0 | 1 | 0.0434 | 0.0650 | 0.2220 |
| L | 1 | 0 | 2 | 0.0465 | 0.0653 | 0.6450 |
| L | 1 | 0 | 3 | 0.0424 | 0.0684 | 0.5600 |
| L | 0 | 1 | 1 | 0.0467 | 0.0379 | 0.2010 |
| M | 0 | 0 | 1 | 0.0831 | 0.1010 | 0.3010 |
| M | 1 | 0 | 1 | 0.1140 | 0.1420 | 0.4940 |
| M | 0 | 1 | 1 | 0.0444 | 0.0563 | 0.2360 |
| O | 0 | 0 | 1 | 0.0396 | 0.0540 | 0.2030 |
| O | 1 | 0 | 1 | 0.0583 | 0.0956 | 0.6500 |
| O | 0 | 1 | 1 | 0.0497 | 0.0772 | 0.3840 |

The particulates had noticeable effects on most toners. With toners B and C, very large tacky agglomerates were formed in the control experiments. However, both particulates reduced the size and tackiness of the agglomerates which were still quite large (>2 mm in some cases). With these toners, 1.0% diisobutyl DBE may have been too much and the effect of the solid polymers was simply to dilute the effect of the plasticizer. The very large agglomerates in the control runs are not detected by image analysis since they are too few (one or two per 1 gram handsheet) and unlikely to appear in the partial surface scan of the technique. For this reason the number and area averages for the control runs of toners B and C are smaller than those for the particulate-treated runs. If a true sampling could be obtained in those controls, the average particle sizes would be much higher.

With toners A, H, I, J, L and O, the particulates appeared to induce agglomeration. In other words, agglomerates formed in the presence of particulates were larger and tended to be more three-dimensional. There is also a tendency for the larger agglomerates to be slightly more tacky. However, in no case (with toners A, H, I, J, L and O) was the tackiness significant, i.e., similar to the controls for toners B and C.

The particulates had very little effect on toners G, K and M. Poly(vinyl chloride) tended to increase agglomeration to a modest degree while the copolymer produced smaller agglomerates than did the control run.

Toner L has been shown to be particularly hard to agglomerate. No agglomeration was seen even using up to 3.0% diisobutyl DBE in the absence of particulate. In accordance with the treatment system of the present invention, however, 1.0% particulate induced agglomeration in the presence of 2.0% or 3.0% diisobutyl DBE. At 1.0% diisobutyl DBE, little or no agglomeration occurred in the presence of particulate. Similar agglomerates were obtained with either 2.0% or 3.0% diisobutyl DBE (with particulate), but those made with the higher dose of DBE were somewhat tacky.

In summary, it appears that solid polymeric particulates such as PVC or poly(vinyl acetate-co-vinyl chloride) level out the effect of the diisobutyl DBE. With very reactive toners, smaller and harder agglomerates result. With less reactive toners, agglomeration is increased. Perhaps most importantly, the use of these solid polymeric particulates induced agglomeration when none occurred in their absence.

EXAMPLE 5

A variety of water insoluble organic particulates (1.0% BOP) were examined for their relative deinking efficiencies when used in conjunction with diisobutyl DBE (1.0% BOP). The physical characteristics of the organic particulates used in this example are summarized in Table 3 below. All were screened against test sheets obtained from the Canon NP6650II (Toner M) using typical pulping conditions as described previously.

TABLE 3

(Physical Properties of Organic Particulates used in Xerographic Deinking)

| Particulate | Density (g/cc) | IV | $T_g$ (°C.) | $T_m$ (°C.) |
|---|---|---|---|---|
| PVC | 1.40 | 0.68 | 82.2 | — |
| poly(vinyl butyral) | 1.08 | — | 63.0 | — |
| poly(ethyl methacrylate) | — | 0.91 | 75.3 | — |
| poly(butyl methacrylate) | — | 0.53 | 27.0 | 104.3 |
| poly(ethylene) | 0.86 | — | — | 103.4 |
| poly(ethylene), Chlo. | 1.10 | — | — | 120.2 |
| Geon ® 121 (PVC) | 1.40 | 1.19 | 80.5 | — |
| Geon ® 137 (PVC/AA) | 1.40 | 1.10 | 83.7 | — |
| Geon ® 138 (PVC/MA) | 1.40 | — | 73.4 | — |
| Geon ® 213 (PVC) | 1.40 | 0.85 | 81.9 | — |

Notes:
AA denotes acrylic acid.
MA denotes methyl acrylate.
Chlo. denotes chlorinated.

For the homopolymer polyvinylchlorides examined, Geon ® 213 yielded slightly larger agglomerates and perhaps more interestingly, much lighter particles (see Table 4 below). This anomaly could be attributed to the larger average particle size for this particular PVC. A larger organic particulate may inherently increase the overall dimension of the formed agglomerate if it is acting as a "seed crystal" and also prevent the densification of the toner fragments by forbidding molding of the fragments into the least porous structure.

The poly(methacrylates), poly(ethylenes), and poly(vinyl butyral) all afforded large, flexible, non-tacky agglomerates (See Table 4). Differences were, however, observed in the densities of the formed agglomerates. In particular, much lighter particles were obtained with the polyethylenes. It is likely that these differences are due to the intricate interactions between the thermoplastic resins in the toner, the organic particulates, and the agglomerating agent.

TABLE 4

(Agglomeration of Single Component Xerographic Waste Paper with Various Organic Particulates)

| Particulate | Total $N_{avg}{}^a$ | $N_{avg}{}^b$ | $A_{avg}{}^c$ | Figure |
|---|---|---|---|---|
| Geon ® 121 | 0.0569 | 0.0697 | 0.1868 | 10a |
| PVC | 0.0424 | 0.0530 | 0.1447 | 10b |
| Geon ® 213 | 0.1588 | 0.2139 | 0.6677 | 10c |
| poly(butylmethacrylate) | 0.2494 | 0.5574 | 7.3708 | 11a |
| poly(ethylmethacrylate) | 0.1835 | 0.3547 | 5.4327 | 11b |
| poly(vinylbutyral) | 0.2334 | 0.4604 | 3.4327 | 11c |
| poly(ethylene) | 0.2395 | 0.4406 | 2.7068 | 12a |
| poly(ethylene), chlorinated | 0.2528 | 0.4910 | 5.1658 | 12b |

Notes:
$^a$designates the combined number average of all particles detected.
$^b$designates the number average of particles greater than EBA reference (>0.002 mm$^2$).
$^c$designates the area average of particles greater than EBA reference (>0.002 mm$^2$).

EXAMPLE 6

The pulping factors of dosage poly(vinyl chloride), dosage diisobutyl DBE, water hardness, and addition order of polyvinyl chloride (PVC) and diisobutyl DBE were examined using a D-optimal experimental design. Experimental runs were conducted using the following process variables:

| | |
|---|---|
| PVC dose | 0.5, 1.25, 2.0% (wt. % BOP, based on paper) |
| Diisobutyl DBE dose | 0.5, 1.25, 2.0% (wt. % BOP) |
| Water hardness | 0.0, 112.5, 225.0 ppm (as CaCO$_3$) |
| Addition Order | P = PVC followed by DBE; A = DBE followed by PVC |
| Particle Density | 0.0 to 1.0 (based on the fraction of particles with densities >1.10 g/cc) |
| Agglomerant Activity | 0.0 to 4.0 (based on particle size distribution). |

Test sheets were prepared from the Canon NP6650II copier as previously described. All other important pulping parameters were held constant under the following conditions:

| | |
|---|---|
| NaOH Concentration | 1.0% (BOP) |
| Mixing Time | 40 minutes |
| Mixing Speed | 1250 rpm |

The response factors observed were particle density and activity (particle size distribution). The values for particle density correspond to the fraction of particles having densities greater than 1.10 g/cc. The sixteen experimental runs and results are listed in Tables 5 and 6 below.

TABLE 5

| PVC Dose (%) | DBE Dose (%) | H$_2$O Hardness (ppm CaCO$_3$) | Addition Order | Density (Particle Fraction) | Activity |
|---|---|---|---|---|---|
| 2.00 | 0.50 | 112.50 | p | 0.85 | 2.00 |
| 0.50 | 2.00 | 225.00 | a | 1.00 | 3.00 |
| 2.00 | 0.50 | 225.00 | a | 0.60 | 2.00 |
| 2.00 | 0.50 | 0.00 | a | 0.10 | 1.00 |
| 0.50 | 0.50 | 0.00 | p | 1.00 | 1.00 |
| 2.00 | 2.00 | 0.00 | p | 1.00 | 3.00 |
| 1.25 | 0.50 | 112.50 | a | 0.85 | 2.00 |
| 0.50 | 0.50 | 225.00 | p | 1.00 | 2.50 |
| 1.25 | 1.25 | 0.00 | p | 1.00 | 4.00 |
| 0.50 | 2.00 | 0.00 | a | 1.00 | 3.00 |
| 2.00 | 2.00 | 225.00 | p | 1.00 | 3.00 |
| 0.50 | 0.50 | 225.00 | a | 1.00 | 2.50 |
| 0.50 | 2.00 | 112.50 | p | 1.00 | 4.00 |
| 0.50 | 1.25 | 112.50 | a | 1.00 | 3.00 |
| 2.00 | 2.00 | 225.00 | a | 0.50 | 2.00 |
| 2.00 | 2.00 | 0.00 | a | 0.25 | 2.50 |

TABLE 6

(Agglomeration of Single Component Xerographic Waste Paper under a Variety of Process Conditions)

| CONDITIONS | | | | PARTICLE SIZE (mm$^2$) | | |
|---|---|---|---|---|---|---|
| % PVC Dose | % DBE Dose | H$_2$O Hardness (ppm CaCO$_3$) | Addition Order | Total $N_{avg}{}^a$ | $N_{avg}{}^b$ | $A_{avg}{}^c$ |
| 0.5 | 0.5 | 0.0 | A | 0.0888 | 0.1220 | 0.4461 |
| 0.5 | 2.0 | 0.0 | A | 0.1663 | 0.2490 | 4.6953 |
| 2.0 | 2.0 | 0.0 | P | 0.2781 | 0.5260 | 4.0685 |
| 2.0 | 2.0 | 0.0 | A | 0.1952 | 0.3038 | 1.3743 |

Notes:
$^a$designates the combined number average of all particles detected.
$^b$designates the number average of particles greater than EBA reference (>0.002 mm$^2$).
$^c$designates the area average of particles greater than EBA reference (>0.002 mm$^2$).

In summary, the present inventors have discovered that (1) an enhancement in particle size is observed with an increase in dose of diisobutyl DBE, (2) increasing the dose of PVC was detrimental to maximizing the density of the toner agglomerates, and (3) particulate PVC should be added prior to diisobutyl DBE to maximize both particle density and agglomerate size.

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

What is claimed is:

1. A method for deinking of repulped xerographic paper comprising:
   adding an organic polymeric particulate and a substantially water insoluble organic ester to a repulped aqueous slurry containing xerographic toner particles in an amount sufficient to at least partially agglomerate said xerographic toner particles within said slurry to larger particle sizes wherein said ester is selected from the group consisting of: diisobutyl succinate, diisobutyl glutarate, diisobutyl adipate, transmethyl cinnamate and combinations thereof; wherein said agglomeration is conducted at a temperature in the range between about 15° C. to about 35° C.; and
   removing said xerographic toner particles from said slurry by one or more liquid/solid separation techniques.

2. The method according to claim 1 wherein said solids/liquid separation method is selected from the group consisting of: screen, dissolved air flotation and centrifugal cleaning.

3. The method according to claim 1 wherein said particulate is added to said repulped aqueous slurry in an amount between about 0.5 to about 2.0 weight percent, based on the total weight of dry solids in said repulped aqueous slurry.

4. The method according to claim 1 wherein said ester is added to said repulped aqueous slurry in an amount between about 0.5 to about 2.0 weight percent, based on the total weight of dry solids in said repulped aqueous slurry.

5. The method according to claim 1 wherein said particulate is added to said repulped aqueous slurry before addition of said ester.

6. A method for recycling of xerographic paper comprising:
    repulping an aqueous paper slurry of xerographic paper which comprises xerographic toner particles and paper fiber;
    adding an organic polymeric particulate and a substantially water insoluble organic ester to said repulped aqueous slurry in an amount sufficient to at least partially agglomerate said xerographic toner particles within said slurry to larger particle sizes wherein said ester is selected from the group consisting of: diisobutyl succinate, diisobutyl glutarate, diisobutyl adipate, transmethyl cinnamate and combinations thereof; wherein said agglomeration is conducted at a temperature in the range between about 15° C. to about 35° C.
    removing said xerographic toner particles from said repulped aqueous slurry by one or more liquid/solid separation techniques to form a fiber-rich portion and a toner-rich portion; and
    forming a paper sheet from said fiber-rich portion.

7. The method according to claim 6 wherein said solids/liquid separation method is selected from the group consisting of: screen, dissolved air flotation and centrifugal cleaning.

8. The method according to claim 6 wherein said particulate is added to said repulped aqueous slurry in an amount between about 0.5 to about 2.0 weight percent, based on the total weight of dry solids in said repulped aqueous slurry.

9. The method according to claim 6 wherein said ester is added to said repulped aqueous slurry in an amount between about 0.5 to about 2.0 weight percent, based on the total weight of dry solids in said repulped aqueous slurry.

10. The method according to claim 6 wherein said particulate is added to said repulped aqueous slurry before addition of said ester.

* * * * *